(12) United States Patent
Nathan

(10) Patent No.: US 6,456,952 B1
(45) Date of Patent: Sep. 24, 2002

(54) SYSTEM AND METHOD FOR TOUCH SCREEN ENVIRONMENTAL CALIBRATION

(75) Inventor: Robert H. Nathan, Atlanta, GA (US)

(73) Assignee: NCR Coporation, Dayton, OH (US)

( * ) Notice: Subject to any disclaimer, the term of this patent is extended or adjusted under 35 U.S.C. 154(b) by 0 days.

(21) Appl. No.: 09/538,102

(22) Filed: Mar. 29, 2000

(51) Int. Cl.$^7$ .......................... G01C 17/38; G01P 21/00
(52) U.S. Cl. ........................ 702/94; 73/1.15; 178/18.01; 178/18.02; 345/173; 345/174; 345/178
(58) Field of Search ..................... 702/94, 95; 73/1.15, 73/1.57; 178/18.01, 18.02, 18.04, 18.06; 345/173, 174, 178

(56) References Cited

U.S. PATENT DOCUMENTS

| | | | |
|---|---|---|---|
| 4,575,581 A | 3/1986 | Langberg | 178/18.02 |
| 4,737,773 A | 4/1988 | Kobayashi | 345/178 |
| 5,101,081 A | 3/1992 | Drumm | 345/174 |
| 5,149,919 A | * 9/1992 | Greanis et al. | 178/19 |
| 5,274,362 A | 12/1993 | Potvin | 345/178 |
| 5,345,807 A | 9/1994 | Butts et al. | 73/11.5 |
| 5,471,226 A | 11/1995 | Suzuki et al. | 345/173 |
| 5,563,632 A | * 10/1996 | Roberts | 345/173 |
| 5,565,894 A | 10/1996 | Bates et al. | 345/178 |
| 5,889,236 A | 3/1999 | Gillespie et al. | 178/18.1 |
| 6,285,358 B1 | * 9/2001 | Roberts | 345/173 |

* cited by examiner

Primary Examiner—John S. Hilten
Assistant Examiner—John Le
(74) Attorney, Agent, or Firm—Maginot, Moore & Bowman LLP

(57) ABSTRACT

A system and method compensates for drift in electronic touch screens. A plurality of touch areas and drift areas are defined for a touch screen. From location coordinates generated by the screen, a ratio between detected touch hits in each defined touch area and detected touch hits in each corresponding drift area is computed. The computed ratio is compared to a calibration threshold to determine whether the number of touch hits in the drift area are excessive. If they are, a correction vector for all or a portion of the screen may be computed and used to adjust subsequent location coordinates or a calibration signal may be generated. The calibration signal may be a data message transmitted to a remote site to indicate a service call is required at the site of the touch screen and computer. Preferably, the system includes a location adjustor that determines whether the adjustment vectors for a plurality of keypad areas have a corresponding direction and magnitude. If they do, the location adjustor adjusts the definition of the touch and drift areas in the keypad memory.

20 Claims, 3 Drawing Sheets

SYSTEM AND METHOD FOR TOUCH SCREEN ENVIRONMENTAL CALIBRATION

FIELD OF THE INVENTION

This invention relates generally to electronic touch screens and, more particularly, to methods and systems for detecting calibration drift in touch screens.

BACKGROUND OF THE INVENTION

Electronic touch screens that provide coordinate data regarding the location of an object being brought into proximity to a screen are well known. Typically, keypads are displayed on touch screens to receive user input for application programs. These keypads are comprised of a plurality of keys that are displayed on a screen. Each keypad typically is defined by two or more corner coordinates and/or length and width parameters. These keypad data define areas on the screen that correspond to particular keys. In response to an object being brought into proximity to the screen, the screen generates location coordinates for the 'touch' and a screen control program determines whether the coordinates of the 'touch' correspond to one of the defined keypad areas. If they do, the screen control program retrieves input data that correspond to the keypad area that was 'touched' and this input data are provided to an application program. Otherwise, no input data are recognized as being generated from the touch screen and exception processing may occur to indicate an erroneous touch to the user.

Typically, touch screens are used with computers placed in locations having environmentally changing conditions. For example, touch screens are frequently displayed on automatic teller machines (ATMs) that are located outside of bank branches or shopping malls. Over extended periods of time, the temperature and humidity fluctuations may degrade the operating characteristics of the hardware components of the touch screen. Also, screen component wear or aging may also degrade the operation of a touch screen. The changes in the operating characteristics may result in a consistent change in the location coordinates generated in response to 'touches' to the screen. That is, the components of the server 'sense' the touch as occurring at a location that does not exactly correspond with the actual touch location. Thus, the location coordinates generated by the screen may be displaced by a consistent height and width from the actual location of the 'touches' sensed by the screen. Such a discrepancy between the actual locations of 'touches' and their sensed locations may occur when the components of the screen are assembled. This discrepancy is brought within an acceptable toleration range by a calibration procedure at the factory before being placed in the field for use. Consequently, the change in the touch screen components that cause the generated location coordinates to move outside the acceptable range of correspondence is called calibration drift.

As calibration drift occurs, a touch screen begins to generate location coordinates that lie outside of the defined keypad areas despite the touches actually occurring within the displayed keypad areas. Eventually, the touch screen consistently generates location coordinates that are outside of the defined keypads and users are increasingly unable to provide input to the application programs using the touch screen. This condition is either detected by users complaining about frustrations in efforts to use an application program accepting input from the touch screen or by observance of this phenomena by maintenance personnel performing periodic maintenance on the computer and touch screen. As calibration procedures are typically beyond the abilities or resources of maintenance personnel, the computer and touch screen must be taken out of use and returned to the manufacturer or service center for recalibration. Thus, significant downtime may occur as a result of a touch screen experiencing calibration drift between scheduled maintenance visits and/or returns of the screen for re-calibration.

What is needed is a method for automatically detecting calibration drift in a touch screen before touch screen operation substantially degrades.

What is needed is a method for correcting calibration drift and increasing the operational life of touch screens.

SUMMARY OF THE INVENTION

The above-noted limitations of previously known touch screens have been overcome by a system and method made in accordance with the principles of the present invention. The method of the present invention is comprised of defining a plurality of touch areas for a touch screen, defining a plurality of drift areas that correspond to the plurality of touch areas, computing a ratio between detected touch hits in each defined touch area and detected touch hits in each corresponding drift area, comparing each computed ratio to a calibration threshold, and generating a calibration signal in response to a majority of said computed ratios exceeding the calibration threshold. The touch areas preferably correspond to keypad areas for a touch screen and are in rectangular shapes, although other shapes may be used. A drift area is preferably provided for each touch area and is preferably centered about its corresponding drift area, although such centering is not required by the principles of the present invention. Location coordinates are compared to the defined touch areas and drift areas to determine whether 'touches' are in a touch area or drift area for a keypad area. The number of touches for the touch area and the number of touches for the drift area of each keypad area are accumulated. The ratio of the accumulated drift area hits to the accumulated touch area hits indicates whether the 'touches' or hits that correspond to a keypad area are occurring within the displayed area for a particular keypad area or simply near it. As the number of hits outside the touch area for a keypad area increases so does this ratio. An increasing ratio indicates the touch screen is generating erroneous location coordinates because most of the 'touches' by users are probably within one of the displayed keypad areas. The calibration threshold is selected to correspond to a ratio that detects the need for touch screen calibration before the touch screen performance degrades to a level that jeopardizes the operation of the application program.

The calibration signal may be a data message transmitted to a remote site to indicate a service call is required at the site of the touch screen and computer. If downtime before the next scheduled service call can be tolerated, the calibration signal may be comprised of an out-of-service message displayed on the touch screen or stored at the touch screen site. The message may include a service code to indicate calibration is required.

The method of the present invention may further include computing a drift vector from the location coordinates for the hits detected in the drift areas. A drift vector may be computed for each hit detected in a drift area for a keypad area and these vectors may be averaged to form an adjustment drift vector for a keypad area. Adjustment vectors for more than one of the keypad areas may be compared to determine whether the adjustment vectors are of approximately the same magnitude and direction. If they are, the method of the present invention may define a correction vector that may be used to adjust all location coordinates before sending them to the application program coupled to the touch screen. If the correction vectors associated with different keypad areas do not closely correspond then a correction vector may be associated with each keypad area that had a computed ratio exceeding the calibration threshold. Each correction vector may then be used to adjust location vectors having coordinates within the drift area associated with the correction vector.

Rather than computing an adjustment vector, the location coordinates for hits in a drift area of a keypad area may be stored in a drift hit list. The list is preferably updated by overwriting the location coordinates of the hit stored for the longest period of time with the location coordinates of the most recent hit. If the drift/touch ratio for a keypad area exceeds the calibration threshold then the coordinates of the hits in the list are used to compute an adjustment vector. Again, the adjustment vectors for more than one keypad area may be compared to determine whether a correction vector may be computed and used to correct location coordinates for the entire screen or individual keypad areas before sending them to the application program.

In a system implementing the principles of the present invention, a keypad memory stores data for defining a plurality of touch areas and drift areas. A hit detector compares location coordinates received from a touch screen to the coordinates defining the touch areas and drift areas for keypad areas displayed on the touch screen. A hit memory stores the number of hits in each defined touch area and drift area. The memory may also be used to store the drift hit list if it is used. A calibration detector computes a ratio of hits accumulated for a drift area to accumulated hits for the touch area of the corresponding keypad area. The calibration detector compares the ratio to a calibration threshold to determine whether calibration is required. If it is required, a calibration signal may be generated. Preferably, the system includes a location adjuster that determines whether the adjustment vectors for a plurality of keypad areas have a corresponding direction and magnitude. If they do, the location adjuster adjusts the definition of the touch and drift areas in the keypad memory. The hit list and counters are then re-initialized. Alternatively, the adjuster may store a correction vector in the memory so the hit detector may adjust location coordinates before processing.

The system and method of the present invention monitor location coordinates generated by a touch screen and detect whether the coordinates indicate that the components of the touch screen are drifting out of calibration. If the drift is consistent across the displayed keypad area, a correction vector for the entire screen may be computed to adjust the touch and drift areas or correct location coordinates before processing. If the drift vectors computed for multiple keypad areas are not in the same direction and are not of approximately the same magnitude then a correction vector may be computed for each keypad area for which the calibration threshold was exceeded. Each correction vector may then be used to adjust location vectors having coordinates in the associated drift area. If location vector adjustment of the location coordinates cannot be performed and a maintenance signal may be generated. Thus, the system and method of the present invention automatically detects calibration drift in a touch screen before significant degradation occurs and compensates for that drift if possible.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various steps and arrangement of steps. The drawings are only for purposes of illustrating an exemplary embodiment and are not to be construed as limiting the invention.

DETAILED DESCRIPTION OF THE INVENTION

Figure 1:
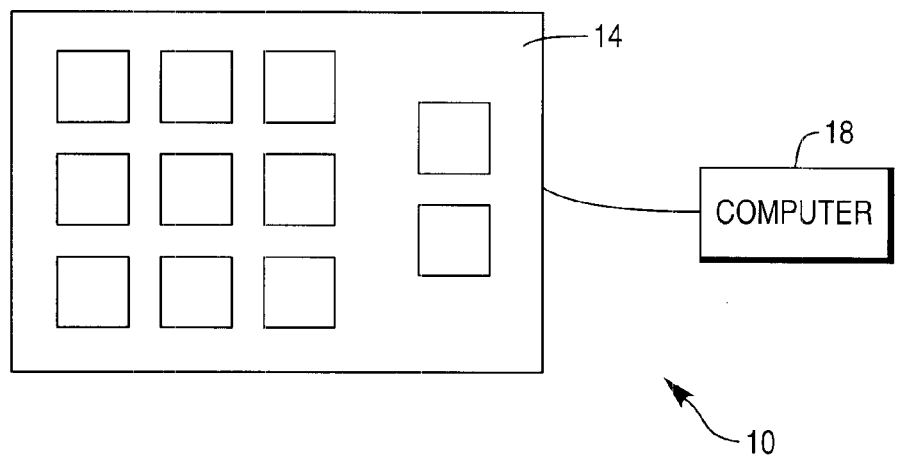
FIG. 1 depicts a system in which the method of the present invention may be implemented.

A system 10 in which the method of the present invention is implemented is shown in FIG. 1. System 10 includes a touch screen 14 that is coupled to a computer 18. Touch screen 14 may be any known touch screen that generates coordinates for a location where an object is brought into proximity to screen 14. Screen 14 may be a resistive touch screen across which one or more sensing voltages are dropped. These voltages are grounded by an object touch to alter the voltage drop across the screen and indicate the relative position of the 'touch' on the screen. For example, a touch in the area approximately ⅗ the width of screen 14 generates a voltage that is approximately ⅗ of the sensing voltage dropped across the width of screen 14 when no touch is being sensed. A second sensing voltage in the height direction of screen 14 may be used to generate a voltage indicative of the height displacement of the touch. Other touch sensing screens may be used such as capacitance screens or matrix arrangement screens. Any screen that generates signals indicative of the relative position of a touch may be used.

Computer 18 of system 10 includes an application program that uses a driver to display a keypad or other input structure on screen 14 and receives data regarding the position of a touch on screen 14. The screen driver may receive voltage or current signals as analog or digital data from screen 14 and convert them to coordinate data or screen 14 may provide digital location coordinate data to the screen driver. While the method and system of the present invention are described as monitoring coordinate data, one should appreciate that the conversion of location indicating signals to coordinate data may be included in the method and system of the present invention. The method and components of the present invention may be implemented as part of the screen driver or they may be implemented as a separate hardware or software component that is coupled between screen 14 and the driver of computer 18.

Figure 2:
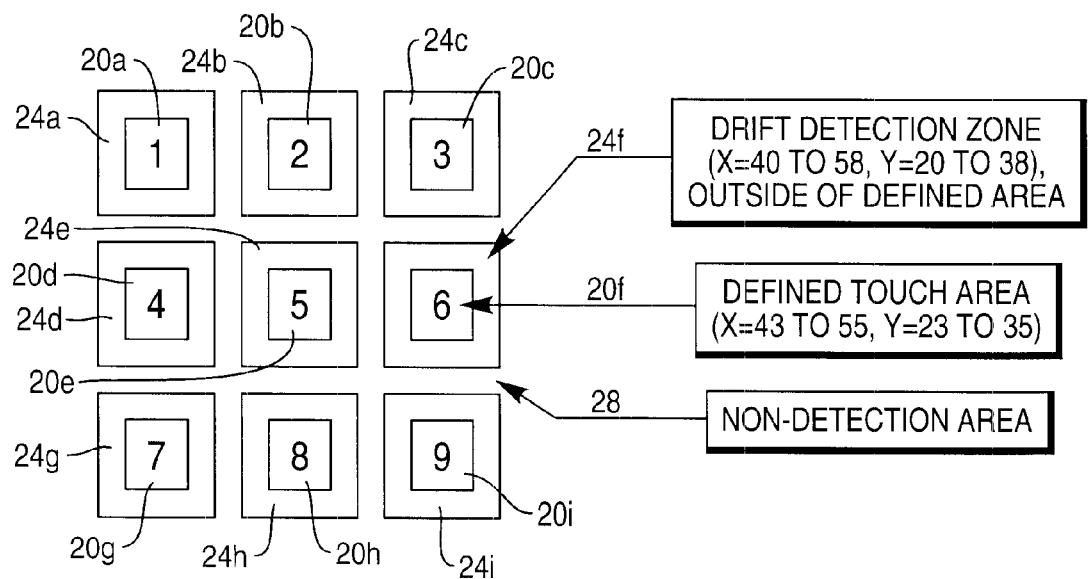
FIG. 2 is an exemplary arrangement of touch areas and drift areas for a keypad displayed on the touch screen shown in FIG. 1.

In accordance with the principles of the present invention, portions of the area of the display of screen 14 are mapped to touch areas 20a–i and drift areas 24a–i. As shown in FIG. 2, touch areas 20a–i and drift areas 24a–i together cover an area that comprise a keypad area in previously known systems. While drift areas 24a–i are preferably non-contiguous, they may be defined in a manner that makes them contiguous about touch areas 20a–i. In embodiments where drift areas 24a–i are non-contiguous, they may be separated by non-detection areas 28.

Touch areas 20a–i correspond to character or other data used by an application program executing in computer 18. Drift areas 24a–i, when noncontiguous, correspond to the same character or other data of the touch area that they surround. Non-detection area 28a–i does not correspond to any character or other data but location coordinates are generated for touches or hits detected in that area.

Figure 3:
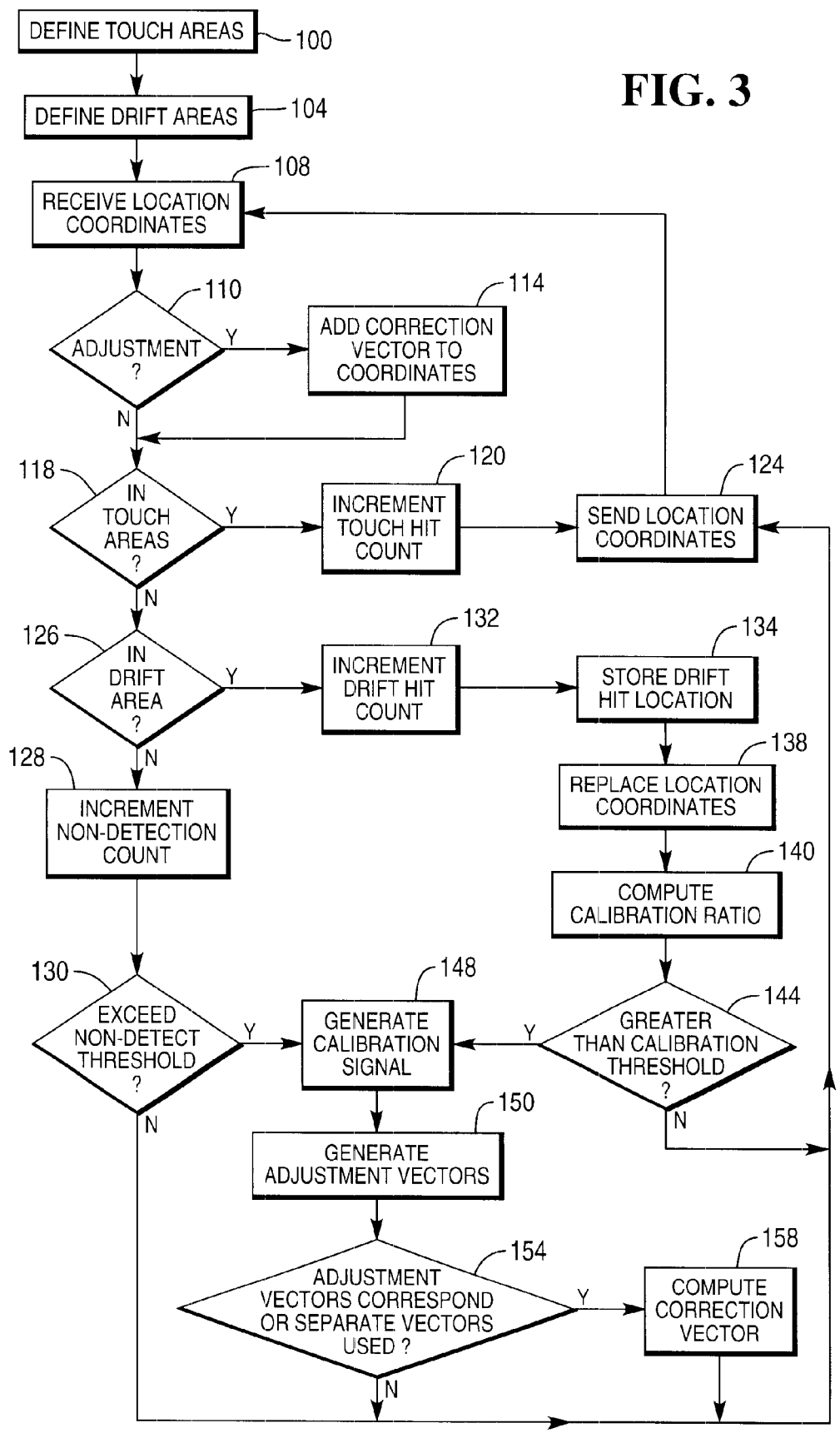
FIG. 3 is a flowchart of a method for detecting calibration drift from location coordinates for hits detected in the touch areas and drift areas of FIG. 1.

An exemplary method for detecting calibration drift in a touch screen is shown in FIG. 3. By known calibration procedures location coordinates are defined for touch areas 20a of screen 14 at a factory or service site (Block 100). Drift areas 24a–i having a defined shape and size are also defined for each touch area (Block 104). Preferably, the shape of a drift area is the same as its corresponding touch area and is centered about its corresponding touch area, although shapes other than the ones used for the touch areas and placements not centered about the touch areas may be used. As location coordinates are generated by screen 14 for the application program, they are received (Block 108). If the location coordinates are to be adjusted (Block 110), a correction vector is added to the coordinates (Block 114). As discussed below, the correction vector may be for the entire screen or each keypad area may have a correction vector associated with it and used to correct location coordinates in the drift area of the keypad area. The location coordinates are compared to the touch area coordinates to determine whether they lie within a touch area (Block 118). If they do, the hit counter for the corresponding touch area is incremented (Block 120) and the location coordinates are passed to the screen driver for further processing (Block 124). If not, they are compared to drift area coordinates to determine whether they lie within a drift area (Block 126). If the location coordinates do not correspond to a drift area, the non-detection counter is incremented (Block 128) and compared to a non-detection threshold (Block 130). If the threshold is exceeded, a calibration signal is generated (Block 148) and the process determines whether a correction vector may be computed and used (Blocks 150–158). If the threshold is not exceeded, the location coordinates are passed to the screen driver for exception processing (Block 124).

If the location coordinates do correspond to one of the drift areas, the hit counter for the corresponding drift area is incremented (Block 132) and the location coordinates for the hit detected in the drift area are stored in a list of drift area hits (Block 134). The location coordinates are replaced with location coordinates within the touch area of the touch area corresponding to the drift area (Block 138). A calibration ratio between the hit counter for the drift area and the hit counter for its corresponding touch area is computed (Block 140). The calibration ratio is preferably computed for the drift area/touch area in which the most recent hit was detected, although computation of the calibration ratio for all touch area/drift area combinations may be performed. The calibration ratio is then preferably compared to a calibration threshold (Block 144) and if they exceed the threshold, a calibration signal is generated (Block 148). Otherwise, the location coordinates are sent (Block 124). In an embodiment of the present invention in which calibration ratios for all touch areas are computed in response to a hit in a drift area, an average or weighted average of the calibration ratios may be computed before the comparison to the calibration threshold occurs. In another embodiment, the calibration ratio for each touch/drift area may be computed and compared to the calibration threshold with a calibration signal being generated in response to a majority of the ratios exceeding the calibration threshold.

If a calibration signal is generated, adjustment vectors for the touch/drift areas are computed (Block 150). These vectors are computed by determining the magnitude and direction of a vector between the center of the corresponding touch area and each hit in the drift area for which location coordinates have been stored. The average of these vectors is then computed as the adjustment vector for a touch/drift area. In like manner, an adjustment vector for each touch/drift area may be computed. These adjustment vectors are then compared to determine whether their directions and magnitudes correspond (Block 154). If they do, these adjustment vectors may be used to compute a correction vector for the entire screen (Block 158). The correction vector may be a mean average, mode, weighted average, or the like of the adjustment vectors. This correction vector is then used to modify location coordinates before sending them to the screen driver (Block 114).

If the direction or the magnitude of the vectors vary too divergently then the hits are not consistently occurring in approximately the same location in each drift area. Consequently, correction of the location coordinates cannot be correlated to a single correction factor. The divergent condition may be detected by comparing the direction of the adjustment vectors and determining whether they are all in the same direction or comparing the magnitudes to determine they are approximately equal. Another possible test includes maintaining a count of the number of times a correction key is used and detecting a divergent condition when the number of correction key uses exceeds an amount indicating repetitive correction for input key entry. Another test may include computation of a correction vector and testing whether it is approximately zero. If it is, the adjustment vectors are so divergent that a common correction vector does not practically alter location coordinates. If the divergent condition exists and adjustment vectors may be used as correction vectors (Block 154), the adjustment vector for each keypad area for which the computed ratio exceeded the calibration threshold may be associated with the keypad area as a correction vector (Block 158). Also, correction vectors for each keypad area may be associated with each keypad area without detecting the divergent condition, if correction for each keypad area is desired. If adjustment vectors for multiple keypad areas are not used for correction vectors because, for example, system resources are not adequate for such processing, a signal may be generated that indicates touch screen 14 requires a service call. This maintenance signal may be transmitted to a remote site or it may be provided at touch screen 14 or computer 18 for review by a technician or other service personnel.

Preferably, adjustment vectors and calibration ratios (if more than one is used to determine whether calibration is required) may evaluate whether to include the adjustment or calibration ratio for a touch/drift area. For example, some keys of a typical keypad are used more frequently than other keys. Thus, the data associated with some keys may be substantially older than the data for other keys. The process may keep a time of data acquisition and not include vectors computed from aged data. Another exemplary evaluation may only compute a vector or ratio for a touch/drift area if the number of total hits exceeds some number or average of hits detected in other regions.

Figure 4:
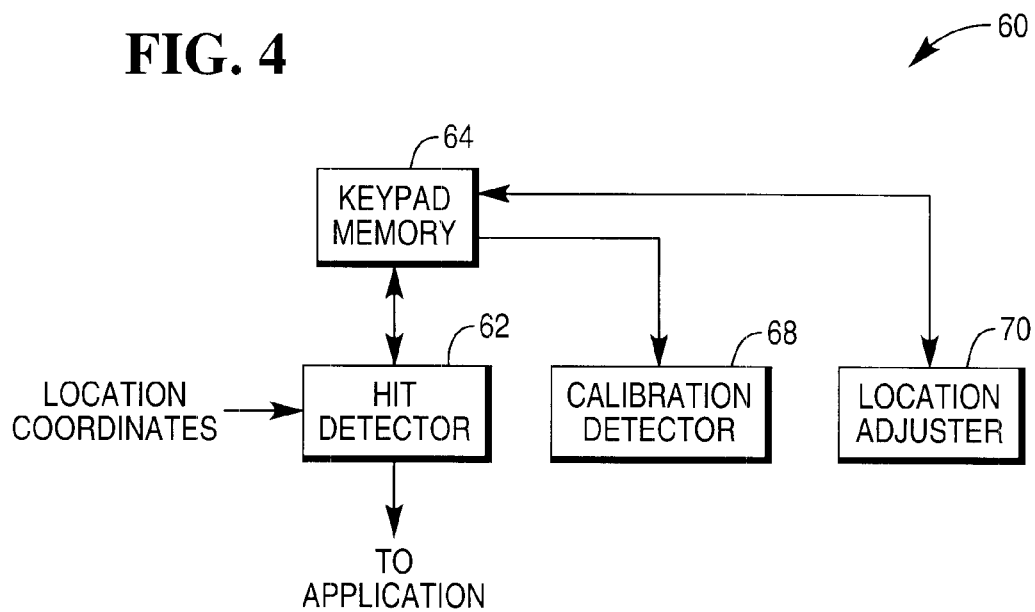
FIG. 4 is a block diagram of components that may be used to implement the method of FIG. 2.

A system implementing the principles of the present invention is shown in FIG. 4. System 60 includes a hit detector 62, a keypad memory 64, a calibration detector 68, and a location adjuster 70. Hit detector 60 receives location coordinates and determines whether to adjust them with a correction vector before processing. The location coordinates defining touch areas and drift areas are stored in keypad memory 64. Memory 64 is also used to store hit lists, vectors, thresholds and other data required for operation of system 60. Calibration detector 68 computes calibration ratios and determines whether the calibration threshold has been violated. If it has, a calibration signal is generated. Location adjuster 70 computes adjustment vectors and evaluates them to determine whether a correction vector for the entire screen may be computed and used to correct touch/drift area coordinates stored in memory 64 or location coordinates as they are received by hit detector 62. Location adjuster 70 may, instead, associate adjustment vectors for each touch/drift or keypad area as correction vectors for correcting location coordinates corresponding to a drift area.

In operation, a system of the present invention may be incorporated in a touch screen or in a computer coupled to a touch screen. The method of the present invention may be implemented in software that executes within a touch screen or a computer coupled to a touch screen. Once initialized, the invention monitors coordinate locations generated by a touch screen to determine whether they lie within a touch area or a drift area. Drift area hits are stored and replaced with touch area coordinates. One or more calibration ratios are computed and compared to a calibration threshold to determine whether the number of drift area hits indicates that calibration may be required. If calibration appears necessary, adjustment vectors are computed for a plurality of touch/drift areas and a correction vector for the screen is computed if the adjustment vectors correspond in direction and magnitude. In response to a determination that adjustment vectors are divergent, a correction vector may be associated with each keypad area having a ratio that exceeded the threshold or a calibration or maintenance signal may be generated to indicate the need for touch screen calibration or service.

While the present invention has been illustrated by the description of exemplary embodiments and processes, and while the various embodiments and processes have been described in considerable detail, it is not the intention of the applicant to restrict or in any limit the scope of the appended claims to such detail. Additional advantages and modifications will readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for detecting calibration drift in a touch screen comprising:

defining a plurality of touch areas for a touch screen;

defining a plurality of drift areas that correspond to said plurality of touch areas;

computing at least one ratio between detected touch hits in one defined touch area and detected touch hits in its corresponding drift area;

comparing said computed ratio to a calibration threshold; generating a calibration signal in response to a majority of said computed ratios exceeding said calibration threshold.

2. The method of claim 1 further comprising:

determining an adjustment vector for each touch area having a computed ratio that exceeds said calibration threshold; and comparing said adjustment vectors to determine direction and magnitude correspondence between said adjustment vectors.

3. The method of claim 2 further comprising:

computing a correction vector in response to said adjustment vectors being determined to correspond to one another; and adjusting location coordinates generated by said touch screen with said computed correction vector.

4. The method of claim 3 wherein said touch hit ajustment is performed by adding said correction vector to location coordinates generated by said touch screen.

5. The method of claim 3 wherein said correction vector is computed as an average of said adjustment vectors.

6. The method of claim 2 further comprising:

associating a correction vector corresponding to said adjustment vector computed for said touch area; and adjusting location coordinates corresponding to said touch area generated by said touch screen with said correction vector associated with said touch area.

7. The method of claim 2 further comprising:

computing a correction vector in response to said adjustment vectors being determined to correspond to one another; and adjusting said touch areas and said drift areas with said computed correction vector.

8. The method of claim 7 wherein said touch area and drift area adjustments are performed by adding said correction vector to said definitions of said plurality of touch areas and said drift areas.

9. The method of claim 1 further comprising:

defining a non-detection area for said touch screen; accumulating a sum of detected touches occurring in said non-detection area;

comparing said accumulated sum to a non-detection threshold; and generating said calibration signal in response to said accumulated sum exceeding a non-detection threshold.

10. A system for detecting calibration drift in a touch screen comprising:

means for storing definitions of a plurality of touch areas for a touch screen and a plurality of drift areas that correspond to said plurality of touch areas;

means for determining whether location coordinates generated by a touch screen correspond to one of said touch areas or one of said drift areas;

means for computing at least one ratio between detected touch hits in one defined touch area and detected touch hits in its corresponding drift area;

means for comparing said computed ratio to a calibration threshold; and means for generating a calibration signal in response to a majority of said computed ratios exceeding said calibration threshold.

11. The system of claim 10 further comprising:

means for determining an adjustment vector for each touch area having a computed ratio that exceeds said calibration threshold; and means for comparing said adjustment vectors to determine direction and magnitude correspondence between said adjustment vectors.

12. The system of claim 11 further comprising:

means for computing a correction vector in response to said adjustment vectors being determined to correspond to one another; and means for adjusting location coordinates generated by said touch screen with said computed correction vector.

13. The system of claim 11 further comprising:
means for associating a correction vector corresponding to said adjustment vector determined for said touch area; and
means for adjusting location coordinates corresponding to a touch area generated by said touch screen with said correction vector associated with said touch area.

14. The system of claim 11 further comprising:
means for computing a correction vector in response to said adjustment vectors being determined to correspond to one another; and
means for adjusting said touch areas and said drift areas with said computed correction vector.

15. The system of claim 10 further comprising:
said memory including a definition of a non-detection area for said touch screen;
means for accumulating a sum of detected touches occurring in said non-detection area;
means for comparing said accumulated sum to a non-detection threshold; and
said calibration signal generating means generating said calibration signal in response to said accumulated sum exceeding a non-detection threshold.

16. A system for detecting calibration drift in a touch screen comprising:
a keypad memory for storing definitions for a plurality of touch areas and a plurality of drift areas;
a hit detector for determining whether location coordinates received from a touch screen correspond to one of said definitions stored in said keypad memory;
a calibration detector for detecting whether a calibration signal is generated in response to location coordinates corresponding to one of said drift area definitions.

17. The system of claim 16 further comprising:
a location adjuster for computing a correction vector in response to location coordinates corresponding to drift area definitions being located from said corresponding touch area by a corresponding direction and magnitude.

18. The system of claim 17 wherein said location adjuster adds said correction vector to said definitions of said touch areas and said drift areas stored in said memory.

19. The system of claim 17 wherein said hit detector adds said correction vector to location coordinates received from said touch screen before determining whether said location coordinates correspond to said definitions stored in said memory.

20. The system of claim 16 further comprising:
a location adjuster for associating a correction vector that corresponds to an adjustment vector for a touch area.

* * * * *

UNITED STATES PATENT AND TRADEMARK OFFICE
CERTIFICATE OF CORRECTION

PATENT NO. : 6,456,952 B1
DATED : September 24, 2002
INVENTOR(S) : Nathan, R. H.

It is certified that error appears in the above-identified patent and that said Letters Patent is hereby corrected as shown below:

<u>Title page,</u>
Item [73], Assignee, delete "NCR Coporation" and substitute -- NCR Corporation --.

Signed and Sealed this

Eleventh Day of March, 2003

JAMES E. ROGAN
*Director of the United States Patent and Trademark Office*